(12) United States Patent
Green et al.

(10) Patent No.: US 7,550,522 B2
(45) Date of Patent: *Jun. 23, 2009

(54) COMPOSITION OF LIQUID THERMOSET RESIN AND GELATOR

(75) Inventors: George Green, Cambridge (GB); John Cawse, Cambridge (GB); Tanya Batchford, Cambridge (GB); Philip Hadley, Cambridge (GB)

(73) Assignee: Hexcel Composites Ltd, Duxford (GB)

( * ) Notice: Subject to any disclaimer, the term of this patent is extended or adjusted under 35 U.S.C. 154(b) by 373 days.

This patent is subject to a terminal disclaimer.

(21) Appl. No.: 10/544,980

(22) PCT Filed: Feb. 13, 2004

(86) PCT No.: PCT/GB2004/000605

§ 371 (c)(1),
(2), (4) Date: Aug. 1, 2006

(87) PCT Pub. No.: WO2004/072145

PCT Pub. Date: Aug. 26, 2004

(65) Prior Publication Data

US 2007/0142600 A1  Jun. 21, 2007

(30) Foreign Application Priority Data

Feb. 13, 2003 (GB) ................ 0303257.0

(51) Int. Cl.
*C08K 5/06* (2006.01)
*C08L 39/00* (2006.01)
*C08L 61/10* (2006.01)
*C08L 63/00* (2006.01)
*C08L 63/02* (2006.01)
*C08L 63/10* (2006.01)
*C08L 67/02* (2006.01)
*C08L 75/04* (2006.01)
*C08L 87/00* (2006.01)
*B32B 27/04* (2006.01)

(52) U.S. Cl. .................. 523/456; 428/297.4; 524/375; 524/378; 524/548; 524/589; 524/590; 524/594; 524/601; 524/606; 525/423

(58) Field of Classification Search .............. None
See application file for complete search history.

(56) References Cited

U.S. PATENT DOCUMENTS

| | | | | | |
|---|---|---|---|---|---|
| 2,067,960 | A | * | 1/1937 | Werntz | 568/648 |
| 2,138,924 | A | * | 12/1938 | Jones | 524/340 |
| 2,290,289 | A | * | 7/1942 | McQueen | 430/546 |
| 3,914,467 | A | * | 10/1975 | Akao et al. | 427/116 |
| 4,212,901 | A | * | 7/1980 | van Neerbos et al. | 427/517 |
| 4,946,908 | A | * | 8/1990 | Chu et al. | 525/426 |
| 4,987,198 | A | * | 1/1991 | Izukawa et al. | 525/491 |

OTHER PUBLICATIONS

Terech et al., "Low Molecular Mass Gelators of Organic Liquids and the Properties of Their Gels," Chem. Rev. 1997, vol. 97, pp. 3133-3159.*

* cited by examiner

*Primary Examiner*—Robert Sellers
(74) *Attorney, Agent, or Firm*—W. Mark Bielawski; David J. Oldenkamp

(57) ABSTRACT

A resin composition comprising: (i) one or more polymerisable liquid thermoset resin components; (ii) optionally one or more curing agents for said one or more polymerisable liquid resin components; and (iii) at least one gelator, wherein said gelator interacts within said composition to form a gel at ambient temperatures, said gel being thermally reversible such that the gelled composition can undergo a transition from the gelled state to a state of lower viscosity when the composition is treated to facilitate the cure of said polymerisable resin component.

9 Claims, No Drawings

COMPOSITION OF LIQUID THERMOSET RESIN AND GELATOR

The present invention relates to improvements in or relating to thermosetting resin compositions.

Thermosetting resin compositions are widely used commercially as adhesives, composites, surface coatings, electronic potting compositions, printed wiring boards and for many other applications. The thermosetting polymer constituent of the resin is typically formed by blending at least one polymerisable liquid resin component with one or more additional components, which function as so-called curing agents or hardeners, and then heating the mixture to yield the fully cured polymer. For example, epoxy resin polymers are made by mixing a liquid epoxy resin with a curing agent, which may be an amine, carboxylic acid anhydride, Lewis acid etc., and then heating the mixture to produce the final cured polymer. Similarly, vinyl ester polymers are made by mixing a liquid vinyl ester monomer with a free radical generating compound and heating the mixture to produce the final cured polymer.

It is often necessary to ensure that the liquid resins are sufficiently mobile at the temperature of cure to allow proper mixing and flow to occur. This necessitates that the viscosity of the liquid resin composition must reach a suitably low level under these conditions. However, it is also often a requirement that the viscosity of the resin is much higher at ambient temperature (that is, typically in the range 10 to 30° C.). This is especially the case in fibre reinforced resin matrices (typically known as prepregs) because if the resin is too mobile at ambient temperature, i.e. the viscosity is too low, a large proportion of the resin may flow out of the fibrous reinforcement during storage.

Therefore, those skilled in the art add various viscosity-enhancing compounds to the liquid resins to increase the viscosity of the resin at room temperature to a sufficient extent to prevent the resin from flowing freely. These compounds include solid resins, polymers and thixotropes, such as colloidal silica. All of these approaches are well known in the art and produce a resin composition that has a high viscosity at ambient temperatures.

However, these conventional methods of increasing the resin viscosity suffer from a disadvantage in that the viscosity remains significantly elevated relative to that of the initial resin composition when the temperature is raised to the cure temperature of the resin. Thus, although the viscosity of such a composition does decrease as the temperature is increased, the decrease is gradual and is not usually sufficient to facilitate the thorough mixing of the constituents of the composition at the cure temperature.

As a consequence, there is a need for a resin liquid composition in which the viscosity of the resin is high at ambient temperatures, but low at the cure temperature of the resin.

According to a first aspect of the present invention there is provided a resin composition comprising:
(i) one or more polymerisable liquid thermoset resin components selected from the group consisting of epoxy resins, bismaleimides, vinyl esters, unsaturated polyesters, isocyanates, phenolics and cyanate esters;
(ii) optionally one or more curing agents for said one or more polymerisable liquid resin components; and
(iii) at least one gelator;

wherein said gelator interacts within said composition to form a gel at ambient temperatures, said gel being thermally-reversible such that the gelled composition can undergo a transition from the gelled state to a state of lower viscosity when the composition is heated to facilitate the cure of said polymerisable resin component.

It has been found that the inclusion of a gelator capable of converting the composition into the form of a thermally reversible gel at ambient temperatures enables the provision of a composition that solves the aforementioned problems associated with known resin compositions. In particular, at ambient temperatures where the composition is in a gelled state, the composition will possess a viscosity that is sufficiently high to impede the ability of the composition to flow freely. This property is extremely advantageous because the resin composition of the invention can be used in conjunction with a fibrous reinforcement and the aforementioned problem whereby liquid resin tends to flow out of the material during storage is obviated, or at least minimized. Furthermore, if the gelled composition is heated to facilitate the cure of the resin, the composition undergoes a transition from the gelled state to a liquid state at a predetermined transition temperature. In the liquid state, it shall be appreciated that the viscosity of the composition is substantially less than that of the gelled state and thus, enables the thorough mixing of the individual components present in the composition to occur while the cure reaction takes place.

For the avoidance of doubt, it shall be understood that the expression "ambient temperature" is used herein to mean the temperature of the surrounding work environment (e.g. the temperature of the area, building or room where the composition is used), exclusive of any temperature changes that occur as a result of the direct application of heat to the composition to facilitate the cure of the resin. This is typically 10-30° C. Furthermore, the compositions of the present invention may be formed with many different types of resin and as such this invention is more versatile than the methods of solving this problem known in the art. For example, in the Applicant's co-pending European Patent Application number 02256431.4, a method for producing a composite assembly by the use of a low melting point, crystallisable epoxy resin and a crystalline curing agent is proposed. Whilst this is a very good method for achieving a high viscosity composition at ambient temperatures with a sharp transition to a low viscosity at high temperatures, it is limited to a comparatively small number of crystalline epoxy resins. In addition, these resins tend to be quite costly when compared to the usual liquid resins used in industry and when other components are added to the crystalline epoxies, the ability to crystallize is much reduced, if not eliminated altogether. Therefore, it is a further advantage that the compositions of the present invention can provide a means for achieving the desirable viscosity-temperature profile mentioned above using a wide range of resin systems, including low cost resin systems. The compositions of the present invention also have the further advantage that in many cases only a small percentage of the gelator is required, typically 1 to 5% by weight of the total resinous composition.

It has also been found, surprisingly, that certain gelator compounds of the present invention undergo a reversible colour change which accompanies gelation (e.g. Compound 16, Table 1). This feature could provide a non-invasive method for the monitoring of viscosity and gelation in a liquid composition.

The use of a gelator is an important aspect of the present invention. The gelator may be non-polymeric or polymeric such that liquid resins can be rendered gel-like. Furthermore, upon heating of the resin suitable gelators facilitate a decrease in the melt viscosity.

Any suitable gelator compound that is capable of converting the composition into the form of a gel having a viscosity sufficiently high to prevent or minimize the flow of the composition at ambient temperatures, but which also melts to a low viscosity state when the composition is heated to facilitate the cure of the polymerisable liquid resin component or components, may be used in the compositions of the present invention. By the terms "gel" or "gelled" we mean a semi-solid material which displays properties typical of a colloidal gel, that is to say it retains its shape on removal from a container and displays an elastic modulus in the order of some tens of Pascals or higher. A number of suitable gelator compounds have been identified. These compounds dissolve in the low viscosity liquid resin components at a temperature typically between 20 and 100° C. and on cooling (typically to a temperature 10° C. or more below the temperature at which the gel will re-melt), these solutions form thermally-reversible gels. Thus, at a temperature typically in the range 30 to 80° C. depending on the gelator compound and within one or two degrees, the gel melts to re-form the low viscosity liquid resin, and the viscosity thus attained is usually lower than would be the case if no gelator were present or if an alternative thixotropic additive was used. During the cure reaction, the gelator dissolves in the curing polymer mixture and generally remains in a solvated form in the final thermoset polymer. The gelator in this dissolved form has very little effect on the cured properties of the final thermosetting polymer.

Particularly suitable types of non-polymeric gelators include the alkyl ethers of phenols, especially di-functional and tri-functional phenols. Preferably, the alkyl moiety of the alkyl ether is within the range of hexyl to octadecyl.

Compounds that are particularly suitable for use as non-polymeric gelators in the compositions of the present invention include the octyl to octadecyl ethers of catechol, resorcinol, hydroquinone, 4,4'-bisphenol, the naphthalene diols, the anthracene diols, the anthraquinone diols, pyrogallol, phloroglucinol and stilbene diols.

The above derivatives may be optionally substituted on either the aromatic ring(s) or the alkyl chain moieties. Examples of suitable substituents for the aromatic ring(s) comprise: $C_1$ to $C_4$ alkyl; aryl (such as phenyl); $C_5$ or $C_6$ alicyclic rings; halogen; nitro; alkyl ester; and alkyl amide. Preferably the alkyl moieties of the aforementioned alkyl ester and alkyl amide substituents comprise 1 to 4 carbon atoms. In addition, there may be one or more functional groups on the aromatic ring(s) or on the alkyl moiety which enable the gelator to react chemically with the one or more constituents of the liquid composition which it is being used to gel. Especially useful functional groups in this respect are carboxylic acid, amine, thiol, hydroxyl, oxirane (epoxy), isocyanate, cyanate, allyl and vinyl groups. For example, carboxylic acid-functionalised gelators are capable of reacting with epoxy resins during the curing stage, and allyl- and vinyl-functionalised gelators are capable of reacting with vinyl ester and unsaturated polyester resins during the curing stage.

The non-polymeric gelators may be prepared by any of the methods known in the literature. For instance, the phenyl ether gelators which find use in this invention may be prepared via the Williamson synthesis involving the reaction of a phenate salt with an alkyl halide in the presence of a base in a suitable solvent. Reduction of esters and the reaction of the phenol with the appropriate α-olefin are other potential routes. Other reaction conditions may also be employed, for example, the use of supercritical fluids such as carbon dioxide may facilitate the reaction.

The alkyl ureas of aromatic isocyanates are also considered to be particularly suitable gelators. Suitable isocyanates are toluene diisocyanate, 1,4-phenylene diisocyanate, methylenebis(4-phenylisocyanate), xylene diisocyanate, 1,8-naphthalenediisocyanate. Preferably, the carbon chain length is in the range 6 to 18 carbon atoms. The urea compounds may alternatively be made by taking the alkyl isocyanate and reacting with the relevant aromatic diamine. As such, the preferred route will be determined by the availability of the amine and isocyanate component.

International Patent Publication No. WO 99/33066 describes the potential use of epoxy resins as gelators for oil, but not as a material that is capable of being gelled by other species. Simple epoxy resins (i.e. those resins which are commonly understood to be epoxy resins, viz. the reaction products of bisphenol A and bisphenol F with epichlorohydrin, and similar compounds and their higher molecular weight analogues) are not suitable gelators for the compositions of the present invention. Although any gelator capable of performing the desired function may be used in the compositions of the present invention (and hence, the invention should not be construed as being limited to the following hypothesis in anyway), it is believed that in order for a gelator to perform the required function within the compositions of the present invention, the structure of the gelator compound should comprise at least one n-alkyl chain of sufficient length and capable of undergoing molecular packing with like chains on adjacent gelator molecules; and a central, usually aromatic segment, capable of solvating the molecule to be gelled. Furthermore, the gelator normally possesses a degree of symmetry which aids molecular self-assembly and still further, the central aromatic segment is planar or substantially so, thereby limiting the flexibility of the aromatic segment. In practice this excludes conventional epoxy resins, which do not contain suitable long alkyl chains and usually are required to be amorphous and "resinous". However, it would clearly be theoretically possible, and it has been demonstrated herein (see Compounds 16 and 17, Table 1), that a molecule functioning as a gelator could be made which comprises an epoxy functional group attached thereto in such a way as to provide a gelator that also functions as an epoxy monomer. Such epoxy functional molecules may be made by any of the methods well known in the art for making epoxy compounds, for example via the reaction of epichlorohydrin or glycidol with suitable gelator precursors having attached thereto phenol or carboxylic acid derivatives or amines, or via the epoxidation of unsaturated double bonds as in allyl or vinyl substituted compounds.

Particularly, suitable types of polymeric gelator include polyamide gelators sold under the trade name of Sylvagel.

Advantageously, this group of polymeric gelators has molecular weights typically in the range from about 1500 to about 20000 and softening points typically in the range from 60 to 100° C. It is believed that it is the molecular weight characteristics of these polymeric gelators which make them suitable for use in the present invention as the viscosity increases in the melt are only moderate.

The polymeric gelators suitable for use in the present invention have a molecular weight preferably below about 5000.

The ability of many of the compounds of the present invention to be used as gelators for resin compositions is very surprising and unexpected, particularly in view of the prior art. Thus, although low molecular weight gelators are known in the literature to be capable of gelling certain organic solvents, by a mechanism believed to involve the self assembly of fibrillar networks, their use in advanced composite systems using the resin components of present invention has not been described. For example, Clavier et al. [Tetrahedron Letters, 40, (1999), 9021] state that the didecyl hydroquinone ether (Compound 5 in Table 1 below) does not behave as a gelator for the polar solvents acetonitrile, DMF or DMAC, whereas the resorcinol didecyl ether (Compound 3 in Table 1 below) is said to be a non-polymeric gelator for these three solvents. In contrast to this teaching, however, we have very surprisingly found that compound 5 and related compounds are very effective non-polymeric gelators for polar resin components such as amines and epoxy resins.

The types of liquid thermoset resin components which it may be desirable to gel, and which are therefore the subject of the present invention, include epoxy resins such as the glycidyl derivatives of bisphenol A and bisphenol F; the glycidyl derivatives of p-aminophenol and m-aminophenol; monoglycidyl derivatives of aromatic, aliphatic and alicyclic alcohols such as cresyl glycidyl ether, t-butylphenyl glycidyl ether, phenyl glycidyl ether, alkyl C12-C14 glycidyl ether, and the glycidyl ester of neodecanoic acid; polyglycidyl derivatives of polyhydroxy compounds such as glycerol, trimethylolpropane and butanediol; 3,4-epoxycyclohexylmethyl 3,4-epoxycyclohexanecarboxylate, vinylcyclohexene dioxide, hydrogenated bisphenol A diglycidyl ether, bis(2,3-epoxycyclopentyl)ether, the diglycidyl ester of 1,2-cyclohexanedicarboxylic acid, diglycidyl phthalate; aliphatic amines such as 1,3-propanediamine, N,N-diethyl 1,3-propanediamine, triethylene tetramine, diethylene triamine, 4,7,10-trioxadecane-1,13-diamine, m-xylylene diamine; aromatic amines such as benzyldimethylamine, benzylamine, 2,4-diethyl toluene diamine and its mixtures, 2,4-dithiomethyl toluenediamine, tris(dimethylaminomethyl)phenol; alicyclic and heterocyclic amines such as 1,3-cyclohexane diamine, 1,2-cyclohexane diamine, isophorone diamine, p-menthane diamine, methylenebis-(4-cyclohexylamine) and its alkyl substituted derivatives, 1,3-bis-(aminomethyl)cyclohexylamine, aminoethyl piperazine, bis(aminopropyl)-piperazine, 1-methylimidazole and other imidazoles; anhydrides such as hexahydrophthalic anhydride, methylhexahydrophthalic anhydride, methyl nadic anhydride; cyanate esters such as the dicyanate esters of bisphenol E, bisphenol A, bisphenol F; vinyl esters such as the acrylate and methacrylate esters of bisphenol A diglycidyl ether and their substituted derivatives and their mixtures with monomeric diluents such as styrene, methacrylates and acrylates; diluents and flexibilisers of many classes well known in the art; catalysts such as boron trihalides and their amine adducts and mixtures thereof with diluents and carriers; peroxides and hydroperoxides.

Other performance enhancing materials or modifiers may also be incorporated, into the resin formulation. Non-limiting examples of these, which may be used alone or in combination include flame retardants such as those containing phosphorus, including phosphates and phosphonates; tougheners such as polyethersulphone; UV stabilizers; and anti-fungal agents.

The quantity of gelator which needs to be added to the composition to be gelated depends on a number of factors. This includes the specific gelator used, the compound being gelated, the rapidity of gelation required and the "strength" of the gel so formed. Typically, an amount of gelator in the range of 1 to 5 parts per hundred of resin will be found to be satisfactory. However, if a stiffer gel is required, more gelator may be added and vice-versa. Simple experimentation will enable the optimum concentration to be established for a given system.

According to a second aspect of the present invention, there is provided a method of producing a resin composition as hereinbefore defined, said method comprising the steps of:
(i) dissolving a gelator in a polymerisable liquid thermoset resin component selected from the group consisting of epoxy resins, vinyl esters, unsaturated polyesters, isocyanates, phenolics and cyanate esters, by the application of heat;
(ii) optionally adding one or more curing agent(s) for the resin system in (i) above; and
(iii) cooling said composition to form a thermally reversible gel.

The compositions of the present invention may be used in a whole range of applications. In general, the concept could be useful wherever there is a need for a manageable viscosity, for instance in film transfer or adhesives.

Hence, according to a further aspect of the present invention there is provided an adhesive comprising a resin composition as hereinbefore defined. Preferably, the adhesive is in the form of an adhesive paste.

One particular application for which the compositions of the invention are particularly suited is the preparation of fibre reinforced resin composites, i.e. a fibrous reinforcement matrix impregnated with resin composition of the present invention. The resin compositions of this invention allow the potential for low cost liquid resins to be used in a number of applications, but especially those involving combinations of resins with fibrous reinforcements, where the use of solid epoxies or thixotropes would not be acceptable. Such resin compositions may be applied to a fibrous tow or web in such a way as to either fully or partially impregnate the fibre. Alternatively, the said resin composition may be in the form of a separate layer which is in contact with the fibre but does not impregnate the fibre. For instance, a low cost epoxy resin based on the diglycidyl derivative of bisphenol A may be used along with a gelator of the current invention to produce a fibre reinforced assembly which could be stored at ambient temperature (that is, typically in the range 10 to 30° C.) and cured at any temperature above 40° C. This allows for the use of an exceptionally narrow "window" between the storage and the cure temperature.

Therefore, according to another aspect of the present invention, there is provided an uncured fibre reinforced assembly comprising a fibrous reinforcement material and a resin composition as hereinbefore defined.

The fibrous reinforcement material may be fully or partially impregnated with the resin composition, i.e., no more than 50% of the mass of the resin composition co-mingles with, or impregnates, the fibres, rather, 50%+ of the mass of the resin remains outside, or on top of, the fibres.

Alternatively, the resin composition may be in the form of a separate layer which is in contact with the fibre, but does not impregnate the fibre. This resin layer could also be supplied in film form for direct lay-up onto the reinforcement in the mould as part of Resin Film Infusion (RFI) process. Optionally, the resin may also be provided in block or tile form for such RFI applications. This can offer an advantage in that resin blocks containing different ingredients can be placed strategically in positions directly in the mould where the desired performance characteristics are required in the cured component. For example, in a cured component where there is the need for some increase in impact resistance, then resin blocks containing toughening agents can be positioned to achieve this local performance requirement. Similarly blocks containing flame retardant material can be located to provide improved fire resistance in exposed areas. It is also possible to position blocks based on different resin systems. One such example is based on the majority of resin blocks being of a low cost polyester but with a region of epoxy where greater mechanical stability is required.

Thus according to another aspect of the present invention there is provided a resin block comprising a resin composition as hereinbefore defined for application to a fibre reinforcement as part of a resin infusion process.

According to yet another aspect of the present invention there is provided a method of preparing a resin assembly as hereinbefore defined, said method comprising the steps of:

(i) providing a fibrous reinforcement material; and
(ii) applying said resin composition to said fibrous reinforcement.

The resin composition may be applied to the fibrous reinforcement either as a fully mixed homogeneous formulation or the resin ingredients may be applied as separate layers by techniques such as slot coating or multiple layer spraying.

In order to increase the outlife of the resin composition the curing agent may be associated with the fibre reinforcement. In this case the curing of the resin component does not occur until the resin is brought into contact with the fibre reinforcement and cure conditions are applied. This system is particularly suitable for use with resin blocks.

Thus, according to a still further aspect of the present invention there is provided an uncured resin assembly comprising a resin system having one or more polymerisable liquid thermoset resin components as hereinbefore defined and a fibre reinforcement having a curing agent as hereinbefore defined associated therewith.

Whilst any suitable fibrous reinforcement known in the art may be used, the fibrous reinforcement of the present invention is preferably based on synthetic or natural fibers. For example, fiberglass, carbon or aramid (aromatic polyamide) fibers, but the invention is particularly appropriate for fiberglass and carbon fibers. Hybrid or mixed fiber systems may also be envisaged. The use of cracked (i.e. stretch-broken) or selectively discontinuous fibers may be advantageous to facilitate lay-up of the product according to the invention and improve its capability of being shaped.

The matrix resin and fibre compositions of the present invention have good long-term stability at ambient temperature because the increased viscosity of the gelled composition at such temperatures prevents the resin composition from flowing out of the fibrous reinforcement matrix. Furthermore, the conversion to a liquid state when the gel melts on heating to the cure temperature of the resin also enables thorough mixing of the components of the resin composition during the cure process.

Alternatively, it is also possible to utilize the present invention to lay-up in-mould composites analogous to those disclosed in U.S. Pat. No. 4,622,091, i.e., wherein dry fibrous reinforcement layers are brought together with blocks or tiles of resin. However, in the present invention the curative is preferably isolated from the resin by inclusion within, or upon, the fibrous material (i.e., in a format sometimes referred to as a "hardenerpreg" within the composites industry). Furthermore, the blocks of resin, in addition to being gelled, may also include various other additives. In this way, by positioning differing resin blocks next to each other upon the fibrous reinforcement, a composite of starkly different properties, e.g., across its width and/or length, can easily be produced by unspecialized personnel.

The present invention also provides a method for curing the aforementioned uncured resin assemblies comprising the steps The following section describes how the invention may be put into practice in reference to some specific examples.

EXAMPLES

Example 1

Preparation Of A Non-Polymeric Gelator

The dioctyl ether of 4,4'-bisphenol (Compound No. 9 of Table 1 shown below) was prepared as follows:

4,4'-Bisphenol (0.1 mol, 18.62 grams), n-bromooctane (40.56 grams) and anhydrous potassium carbonate (34.55 grams) were dispersed in N,N'-dimethylformamide (150 ml) and heated under a nitrogen atmosphere with mechanical stirring at 120° C. for 5 hours. The resulting mixture was added to water and rinsed with sodium hydroxide solution and water on a Buchner filter, dried and the white product recrystallized from 2-propanol to yield lustrous white flakes of the product, 33.37 grams (80% yield), melting point 115-117° C. The product was identified by means of its mass spectrum (peaks at 410.2 (molecular ion), 298.2 and 186.2 m/z) and shown to be a single component by means of thin layer chromatography.

In the same way were prepared the compounds shown in Table 1 below:

TABLE 1

Identification and melting points of the gelator compounds prepared

| Compound Number | Aromatic Phenol | Ether | MP, ° C. |
|---|---|---|---|
| 1 | Catechol | Didecyl | 38-40 |
| 2 | Resorcinol | Dioctyl | 36 |
| 3 | Resorcinol | Didecyl | 52 |
| 4 | Hydroquinone | Dioctyl | 54-56 |
| 5 | Hydroquinone | Didecyl | 68 |
| 6 | Hydroquinone | Didodecyl | 74 |
| 7 | Hydroquinone | Ditetradecyl | 80-82 |
| 8 | 1.3.5-Trihydroxybenzene | Tris-decyl | 53-56 |
| 9 | 4,4'-Bisphenol | Dioctyl | 115-117 |
| 10 | 4,4'-Bisphenol | Didecyl | 113-114 |
| 11 | 4,4'-Bisphenol | Didodecyl | 112-114 |
| 12 | 1,5-Dihydroxy naphthalene | Didecyl | 89-91 |
| 13 | 2,7-Dihydroxy naphthalene | Didecyl | 56-57 |
| 14 | 1,8-Dihydroxy anthraquinone | Didecyl | 94-96 |
| 15 | 3,5-Dihydroxy benzoic acid | Ditetradecyl | 70-72 |
| 16 | Diglycidyl ester of 2,5-dihydroxyterephthalic acid | Didodecyl | 66-68 |
| 17 | Diglycidyl ester of 2,5-dihydroxyterephthalic acid | Dioctadecyl | 75-77 |
| 18 | 3,3'-Diallyl 4,4'-dihydroxybiphenyl | Didodecyl | 116-118 |

Example 2

Preparation Of A Reactive Non-Polymeric Gelator, 3.5-Bis-(Tetradecyloxy)Benzoic Acid (Compound No. 15)

The bis-tetradecyl ether of methyl 3,5-dihydroxybenzoate was prepared from the latter and bromotetradecane according to the method of Example 1, and was obtained in 89% yield as a white powder, melting point 66-69° C. Twenty grams of this ester were refluxed with aqueous sodium hydroxide to yield a soapy solid which was then acidified with 10% sulphuric acid and the white product was washed with water and recrystallized from methanol/2-propanol to yield 17.6 grams (90% yield) of 3,5-bis-(tetradecyloxy)benzoic acid as a white powder, melting at 70-70.5° C.

The isolated compound (0.30 g) was dissolved in Epikote 828 (a bisphenol A diglycidyl ether epoxy resin product of Resolution Performance Products LLC of Houston, Tex., USA) (10.0 g) by heating briefly at 100° C. and formed a clear solution at this temperature. On cooling, a cloudy gel was formed. This mixture was further heated at 100° C. for 2 hours. After this time, thin layer chromatography (eluant system 2:1 hexane:ethyl acetate) showed the presence of spots corresponding to the gelator (Rf=0.76) the epoxy (Rf=0.35) and the reaction product between the gelator and the epoxy (Rf=0.61). After 4 hours at 100° C., the mixture would no longer gel when cooled, showing that a significant portion of the gelator had reacted with the epoxy and could no longer undergo self-assembly. Measurement of the acid content of the mixture by titration confirmed that after about 4 hours the concentration of free gelator had fallen to 43% of the original value.

Example 3

Preparation Of An Epoxy Functional Non-Polymeric Gelator (Compound No. 16)

Dimethyl 2,5-dihydroxyterephthalate (5.00 g), bromododecane (11.6 g) and anhydrous potassium carbonate (7.63 g) were reacted in N,N'-dimethylformamide at 120° C. under nitrogen for six hours. The solution was cooled and poured into water. After filtration and washing, 11.0 g of the didodecyl ether was obtained. This was hydrolyzed with sodium hydroxide to the diacid salt, acidified and the diacid chloride formed by reaction of 6.6 g of the diacid with a 100% molar excess of thionyl chloride. The acid chloride was added over 30 minutes to a solution of glycidol (2.0 g) and triethylamine (2.56 g) in dry toluene maintained at −10° C. Reaction was continued for 5 hours at 20° C. after which the reaction mixture was extracted with dichloromethane and water and the dichloromethane layer dried over sodium sulfate, filtered and the solvent removed under vacuum. The resulting solid was recrystallized from ethyl acetate to give 2.4 g of a pale yellow solid melting at 66-68° C., the diglycidyl ester of 2,5-didodecyloxyterephthalic acid.

A solution of 3 parts of this compound in 100 parts of Epikote 828, on cooling slowly gelled to form a pale yellow gel. The gel could be melted, and the colour discharged, by warming. Gelation recurred along with the development of the yellow colour on subsequent cooling.

When the above epoxy functional gelator (0.4 g) was heated with 2-phenyl imidazole (0.02 g) at 120° C. for 3 hours, an amber elastomer with a glass transition temperature of 16° C. was formed. This shows that this gelator has the capability to be irreversibly chemically linked into an epoxy resin formulation during the curing stage.

Compound No. 17 was prepared in the same manner as for Compound No. 16 except that bromooctadecane replaced bromododecane. Compound 17, the diglycidyl ester of 2,5-dioctadecyloxyterephthalic acid was isolated from hexane as a white powder, melting point 75-77° C. Once again, this compound formed a thermally reversible gel with a liquid bisphenol A epoxy resin (Epikote 828) (3 parts per hundred of resin) within minutes of being cooled to room temperature, although this time the resulting gel was only faintly coloured.

Example 4

Preparation Of A Diallyl-Functionalised Reactive Non-Polymeric Gelator (Compound No. 18)

3,3'-Diallyl 4,4'-dihydroxybiphenyl was prepared by the Claisen rearrangement of the diallyl ether of 4,4'-bisphenol and was converted into its didodecyl ether in the same manner as for Compound 9 of Example 1 (66% yield). The dodecyl ether was a white crystalline solid, melting point 116-118° C.

30 mg of Compound No. 18 was added to 1 gram of Derakane 470-300 (a styrenated vinyl ester resin, (product of Dow Chemical Company, Midland, Mich., USA) and warmed to 70° C. to dissolve the gelator. The clear solution changed to a thermally reversible gel on cooling.

Example 5

Preparation Of A Bis-Urea Non-Polymeric Gelator 1,2-phenylene diamine (5.71 grams) and octadecyl isocyanate (31.25 grams) were reacted under mechanical agitation in dichloromethane solution for 4 hours and the white waxy product was filtered and washed with dichloromethane and dried to yield the bis-urea as a waxy solid, 26.69 grams, 79% yield.

30 mg of the bis-urea were warmed with 1 g of isophorone diamine and the clear solution allowed to cool. On cooling, a thermally reversible gel was formed.

Example 6

Use Of Compounds As Non-Polymeric Gelators

Compound 5 at a loading of 3% was dissolved in the following free-flowing liquids by warming. On cooling, all formed gels. The temperature at which the gel re-melted on heating is given in parenthesis:

Butanediol diglycidyl ether (30°); bisphenol A diglycidyl ether (43°); trimethylolpropanetriglycidyl ether (35°); Araldite CY-179 (3,4-epoxycyclohexylmethyl 3,4-epoxycyclohexane carboxylate, product of Vantico) (30°); m-xylylene diamine (35°); triethylene tetramine (35°); diethylene triamine (35°); 4,7,10-trioxadecane-1, 13-diamine (35°).

Compounds 6, 7, 9, 10 and 12 were found to be very effective at gelling iosphorone diamine (5-amino-1,3,3-trimethylcyclohexanemethylamine). Compounds 2 to 15 were very effective at gelling liquid bisphenol A diglycidyl ether.

Compound 10 was dissolved at a level of 3% by warming in the following free-flowing liquid resins:

Araldite MY0510 (triglycidyl derivative of p-aminophenol, product of Vantico AG, Basel Switzerland); 4,4'-ethylidenediphenyl dicyanate (Primaset LECy, product of Lonza AG, Basel, Switzerland); Derakane 470-300 (a styrenated vinyl ester resin, product of Dow Chemical Company, Midland, Mich., USA). All three formed clear solutions which gelled rapidly on cooling and re-liquefied on warming from the gel state.

This example shows that compounds of the present invention are useful in being able to produce gels from commonly used resin components. It will be understood that the compounds referred to are only a representative selection of the compounds capable of being usefully gelled and should not, therefore, be construed as a limitation of the scope of the present invention in any way.

Example 7

Uses Of A Polymeric Gelator

Sylvagel 1000 (a low molecular weight, tertiary amide terminated polyamide of Arizona Chemical), 5 parts, was melted into 95 parts of styrenated vinyl ester resin (Derakane Momentum 470-300) at 100° C. The liquid composition was spread on to a silicone treated release paper whereupon thermally reversible gelation occurred resulting in a thin tacky film showing no tendency to flow at 25° C. Similarly, Sylvagel 1000, 5 parts, was dissolved at 110° C. in one hundred parts trimethylolpropane triglycidyl ether to form a transparent solution which cooled to a stiff, elastic gel. The latter gel melted to a pourable fluid above 90° C. A liquid bisphenol A diglycidyl ether, Huntsman LY1556, behaved in the same way when 5 parts Sylvagel 1000 were dissolved therein.

The invention claimed is:

1. A resin composition comprising:
   i) one or more liquid thermoset resin components wherein at least one of said liquid thermoset resin components comprises a polymerisable thermoset resin selected from the group consisting of epoxy resins, bismaleimide resins, vinyl ester resins, unsaturated polyester resins, isocyanate resins, phenolic resins and cyanate ester resins; and
   ii) at least one gelator comprising an alkyl diether or triether of a phenol wherein the alkyl moiety of the alkyl diether or triether of said phenol is within the range of hexyl to octadecyl;
wherein said gelator interacts within said liquid thermoset resin components to form a gel composition at ambient temperatures, said gel composition being thermally reversible such that the gel composition can undergo a reversible transition from a gelled state to a state of lower viscosity when the gel composition is heated.

2. A resin composition according to claim 1, wherein said gelator is selected from the group consisting of octyl to octadecyl diethers or triethers of catechol, resorcinol, hydroquinone, 4,4'-bisphenol, naphthalene diols, anthracene diols; anthraquinone diols, pyrogallol, phloroglucinol and stilbene diols.

3. A resin composition according to claim 1, which further comprises a fibrous reinforcement material.

4. A resin composition according to claim 3, wherein the fibrous reinforcement material is partially impregnated with the gel composition.

5. A resin composition according to claim 3, wherein the gel composition is provided in the form of a separate layer, comprising a film or plurality of tiles, which contacts the fibrous reinforcement material.

6. A resin composition according to claim 1, wherein at least one of said liquid thermoset resin components is a curing agent for said polymerisable thermoset resin.

7. A resin composition according to claim 3, wherein at least one of said liquid thermoset resin components is a curing agent for said polymerisable thermoset resin.

8. A resin composition according to claim 1, wherein the resin composition includes performance enhancing materials or modifiers selected from the group consisting of flame retardants, tougheners, UV stabilisers and anti-fungal agents.

9. A resin composition according to any claim 3, wherein the resin composition includes performance enhancing materials or modifiers selected from the group consisting of flame retardants, tougheners, UV stabilisers and anti-fungal agents.

* * * * *